July 5, 1966  F. V. HALL ETAL  3,259,029
APPARATUS AND PROCESS FOR MAKING FILTER TIPS FOR CIGARETTES
Filed July 11, 1963  9 Sheets-Sheet 2

INVENTORS
FLOYD V. HALL
TIPTON P. SUTTON
BY Kenyon & Kenyon
ATTORNEYS

July 5, 1966 F. V. HALL ETAL 3,259,029
APPARATUS AND PROCESS FOR MAKING FILTER TIPS FOR CIGARETTES
Filed July 11, 1963 9 Sheets-Sheet 3

Fig. 2

INVENTORS
FLOYD V. HALL
TIPTON P. SUTTON

BY Kenyon & Kenyon

ATTORNEYS

July 5, 1966 F. V. HALL ETAL 3,259,029
APPARATUS AND PROCESS FOR MAKING FILTER TIPS FOR CIGARETTES
Filed July 11, 1963 9 Sheets-Sheet 4

INVENTORS
FLOYD V. HALL
TIPTON P. SUTTON

BY Kenyon & Kenyon
ATTORNEYS

July 5, 1966   F. V. HALL ETAL   3,259,029
APPARATUS AND PROCESS FOR MAKING FILTER TIPS FOR CIGARETTES
Filed July 11, 1963   9 Sheets-Sheet 6

INVENTORS
FLOYD V. HALL
TIPTON P. SUTTON

BY Kenyon & Kenyon

ATTORNEYS

July 5, 1966  F. V. HALL ETAL  3,259,029
APPARATUS AND PROCESS FOR MAKING FILTER TIPS FOR CIGARETTES
Filed July 11, 1963  9 Sheets-Sheet 7

INVENTORS
FLOYD V. HALL
TIPTON P. SUTTON

BY Kenyon & Kenyon

ATTORNEYS

United States Patent Office 3,259,029
Patented July 5, 1966

3,259,029
APPARATUS AND PROCESS FOR MAKING FILTER TIPS FOR CIGARETTES
Floyd V. Hall and Tipton P. Sutton, Durham, N.C., assignors to Liggett & Myers Tobacco Co., New York, N.Y., a corporation of New Jersey
Filed July 11, 1963, Ser. No. 294,811
31 Claims. (Cl. 93—1)

This invention relates to an apparatus and process for making filter tips for cigarettes. It relates particularly to an apparatus and process for making filter tips for cigarettes which tips are of multisectional internal construction. It relates more particularly to an apparatus and process for making filter tips for cigarettes which tips each comprise two sections of fibrous entrainment-type filter material, e.g., cellulose acetate, separated by a section of granular adsorption-type filter material, e.g., charcoal, these three sections being bound into an assembly by at least one layer of mouthpiece paper. It relates still more particularly to an apparatus and process for making filter tips for cigarettes of the kind described in an essentially continuous manner at high rates of production.

According to the present invention, there is provided an apparatus which is adapted to receive as a feed a continuously generated stream of fibrous entrainment-type filter material in rod-like form; divide this stream into a moving series of entrainment-type filter elements in axially aligned array with each element being separated by determinate and essentially identical distances from the one behind and the one ahead of it; pick up this moving series of entrainment-type filter elements on an initially transversely flat strip of mouthpiece paper moving at essentially the same speed as the filter element series; form this strip of mouthpiece paper into a channel-like transverse configuration as a partial enclosure for the filter element series; inject a charge of granular adsorption-type filter material into each separation space of the series of spaces between the elements of the entrainment-type filter element series; form the strip of mouthpiece paper completely around those elements of the entrainment-type filter element series between which charges of granular adsorption-type filter material have been injected; seal this strip to generate a continuous rod-like stream of assembled filter material alternately fibrous and granular in internal structure, and divide this rod-like stream through selected fibrous portions thereof into determinate lengths of assembled filter material with each such length comprising the entire filter material needed for at least one cigarette having a filter tip of the kind described.

For a cigarette filter tip making apparatus it is an object of the present invention to provide a filter material retarding ledger and mouthpiece paper conveyor belt mechanism whereby filter elements cut from a continuously generated stream of fibrous entrainment-type filter material of rod-like form and initially in substantially end-to-end abutting relationship after cutting are accelerated consecutively to generate a moving series of filter elements in axially aligned array with each element being separated by determinate and essentially identical distances from the one behind and the one ahead of it.

For a cigarette filter tip making apparatus it is another object of the present invention to provide a radially chambered wheel and chamber plunger and plunger operating mechanism whereby granular adsorption-type filter material loaded into the wheel chambers is injected between spaced, moving elements of fibrous entrainment-type filter material passing in substantially tangential contact with the wheel.

For a cigarette filter tip making apparatus it is another object of the present invention to provide a mouthpiece paper conveyor belt and guide mechanism whereon and whereby an initially transversely flat strip of heat sealable mouthpiece paper having on it a series of spaced and axially aligned fibrous entrainment-type filter elements is carried past mechanism for injecting granular adsorption-type filter material between consecutive entrainment-type filter elements and formed transversely to a channel shape in the course of such carriage, and thereafter formed transversely to a substantially circular, overlapped shape for sealing to enclose fully the entrainment-type filter elements having adsorption-type filter material between them.

It is contemplated that the present invention comprises the several steps and the relation and order of one or more of such steps with respect to each of the others for the production at a high rate of speed of a filter tip for cigarettes.

It is further contemplated that among these steps is the cutting of a rod of fibrous filter material into filter elements of predetermined length, intermittently feeding these filter elements in timed sequence onto a faster traveling conveying means including a traveling strip of mouthpiece paper, forming this mouthpiece paper into a channel-like partial enclosure for the fibrous filter element series, injecting a predetermined quantity of granular adsorption-type filter material into each space between fibrous filter elements, forming the strip of paper completely around the alternately fibrous and granular filter elements, sealing the strip of formed paper into an overlapped tube forming a continuous rod-like stream of assembled filter material and cutting said assembled rod into determinate lengths.

The invention accordingly, comprises the several steps and the relation and order of one or more of such steps with respect to each of the others, and the apparatus embodying features of construction, combination of elements and arrangement of parts which are adapted to effect such steps, all as exemplified in the following detailed disclosure, and the scope of the application of which is indicated in the claims.

These and other objects of the present invention as well as its advantages, nature, and substance will be more clearly perceived and fully understood by referring to the following description and claims taken in connection with the accompanying drawings, in which:

Referring more particularly to the drawings wherein similar characters designate corresponding parts throughout, the general arrangement of the components forming the preferred embodiment of the filter tip making apparatus of the present invention is shown in the FIGS. 1 through 5 and includes a base 20 which for convenience may be made as two units 20A and 20B. On base 20A is mounted a first cutter 22 adapted to receive a continuously advancing rod-formed cellulose acetate filter material 24 and cut said material into filter elements 26. Cutter 22, although performing an essential function in cutting the rod-shaped material 24 into short pieces of equal length, may be of known design and manufacture such as a Standard Cigarette Cut-Off Unit having a cutter head made by American Machine & Foundry Co. identified by catalogue number Class 1, Division 74.

As exemplified, cutter 22 and other hereinafter described components are driven in timed relationship to each other by means of a motor 28, connected by means of a roller chain drive 30 to a base-supported driven shaft 32 and thence by a roller chain drive in which both sprockets 33 and 34 of twenty-four teeth each are connected by a roller chain 35 to a driven jack shaft 36. A first power shaft 38, bearing-supported within the base, is driven by the jack shaft 36 through a roller chain drive in which a jack shaft mounted driver sprocket 39 has thirty-six teeth and a power shaft mounted driven sprocket 40 has eighteen teeth and is driven by a roller chain 41. A beveled driver gear 42 is mounted on shaft 38 and as exemplified has sixty-eight teeth in mesh with and driving a thirty-tooth driven gear 44 which is the power receiving and cutter head driving element of cutter 22. The cutter head as thus driven enables the cutter to provide fifteen hundred filter elements 26 per minute, for example.

Transport of the cut filter elements 26 is provided by a conveying means having the components thereof mounted on the front of base 20B (FIG. 1) and includes an endless belt 46 which may be of a fabric construction having a relatively thin cross-section. This belt is driven by means of a drive pulley 48 mounted on a base-supported bearinged shaft 50 and moves thence to a tensioning pulley 52, idler pulleys 54 and 56, and then through a pivoted guide chute 58 to a tail pulley 60 which, as exemplified, is made of small diameter so as to be located relatively close to cutter 22. The belt 46 then acts as the conveying means from pulley 60 to the drive pulley 48. Timed power rotation of pulley 48, as shown, is by a worm gear reduction 62 driven by a base-supported bearinged second power shaft 64 driven from jack shaft 36 by a roller chain drive having a jack shaft mounted driver sprocket 66 which has twenty-four teeth, a power shaft mounted driven sprocket 67 having eighteen teeth, and a connecting roller chain 68 of suitable pitch. Intermediate the sprockets and providing a tensioning and timing control for shaft 64 is a synchronizing means 70 which is similar in construction and operation to another synchronizing means operating off of first power shaft 38 to be hereinafter described.

Carried by the belt 46 and assisting in the performance of several important functions of the apparatus as well as providing components of the filter products is a continuous strip of mouthpiece paper 72 which may be supplied from roll 74 removably mounted on a hubbed shaft 76 bearing-supported within base 20A. As it is desirable to avoid stretching and possibly breaking the mouthpiece paper 72, there is accordingly provided means to rotate shaft 76 so as to unwind the paper from the roll 74, said means including a worm gear reduction 78 driven by shaft 32. From roll 74 the paper is pulled over idler pulleys 80, 81, and 82, and thence through pivoted guide chute 84 and over pulley 86 to and onto belt 46 where the paper is carried at the speed of the belt by the belt.

Figure 1:
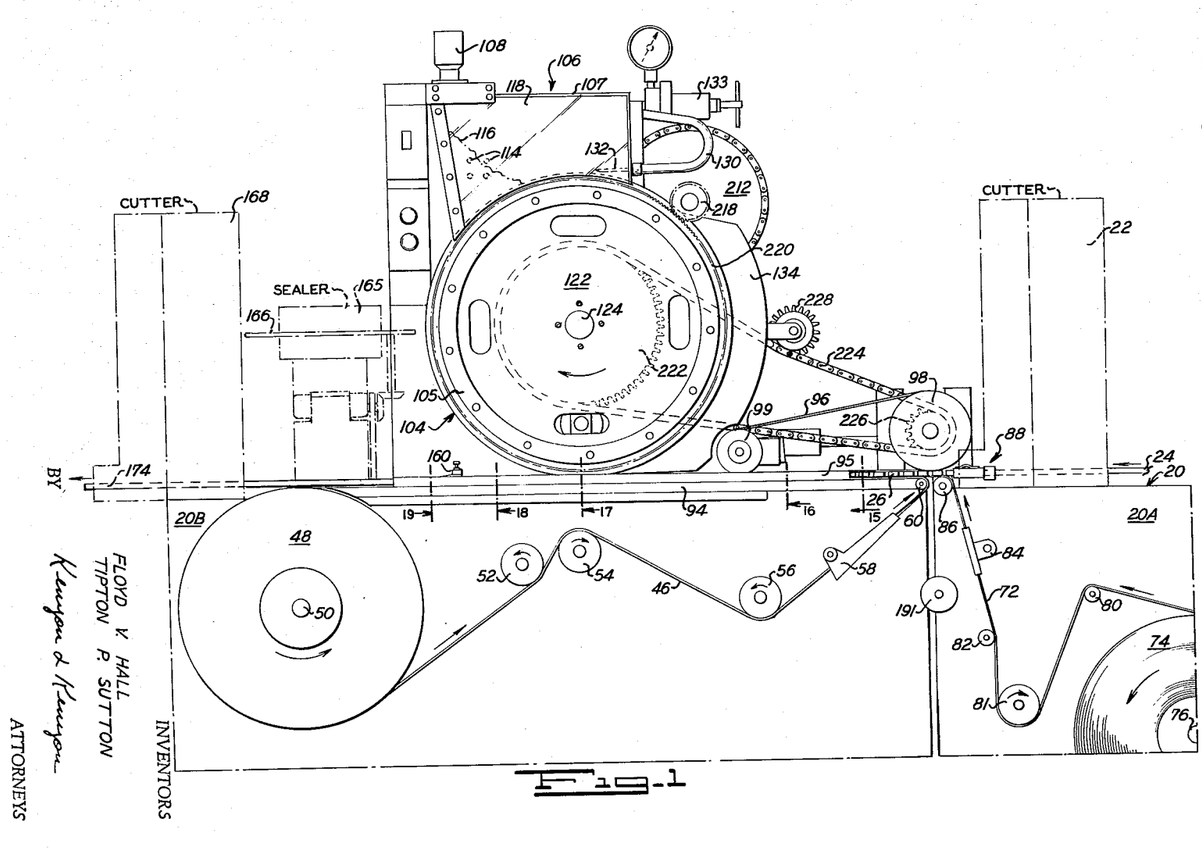
FIG. 1 represents a view in front elevation of the cigarette filter tip making apparatus of this invention.

At the discharge of cutter 22 there is mounted a flow control means identified as a ledger 88 providing a conduit through which the cut fibrous filter elements 26 are pushed to and onto the advancing mouthpiece paper 72. In addition to these elements being conducted in axially aligned arrangement, they are released to the paper in a predetermined timed relationship for the performance of later operations upon them. As seen in FIG. 1 and in enlarged view FIG. 12, the ledger 88 includes a tubular shank 90 having a reduced tubular portion 91 extending outwardly therefrom and having an upper section thereof removed to provide a slot 92 extending from the outer end to a point intermediate the end and the shank. Integral with or attached to portion 91 is a spring finger 93 whose outer end is disposed in the slot and enters the tubular passageway an amount sufficient for the finger to engage and lightly restrain the successively passing fibrous filter elements 26.

Figures 12, 13, 14:
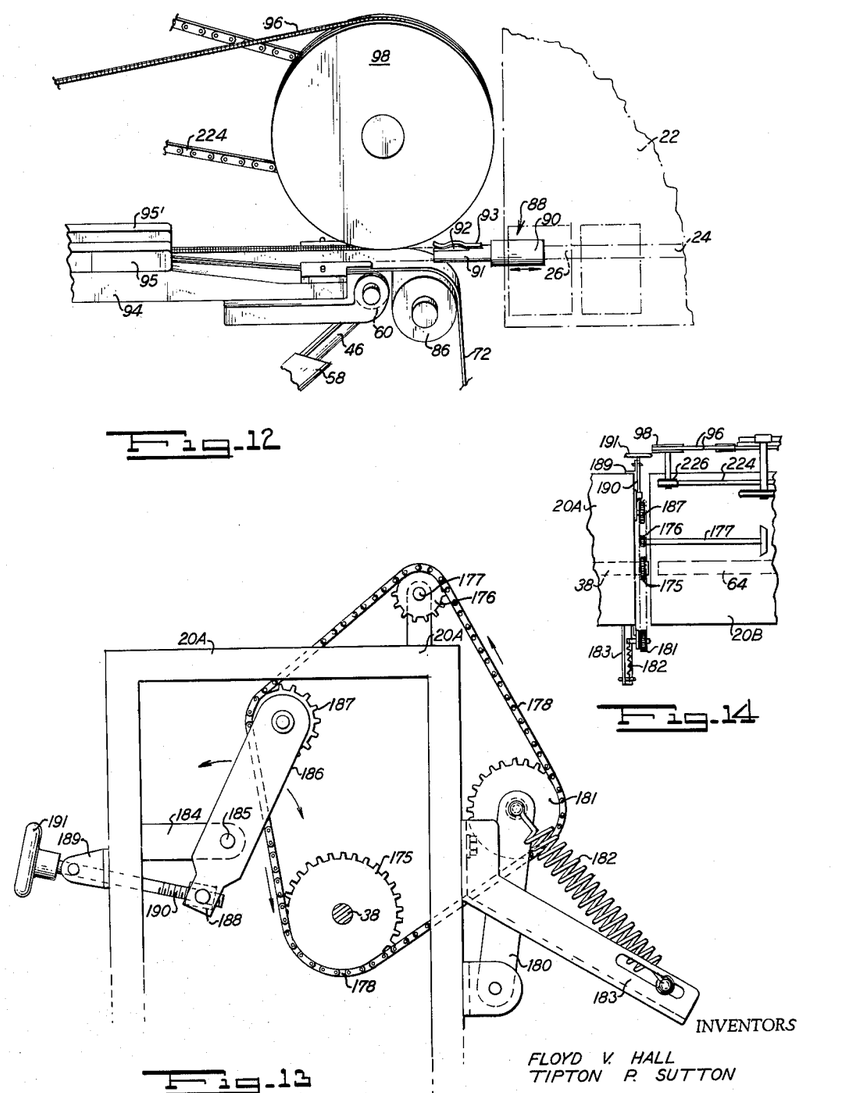
FIG. 12 represents a front perspective view of a portion of the retarding ledger and conveyor belt mechanism of the cigarette filter tip making apparatus of this invention, particularly showing fibrous entrainment-type filter material feeding through the ledger onto mouthpiece paper carried on the conveyor belt, and showing also associated guide means for the belt, mouthpiece paper, and filter material, and running spring means for retaining filter elements on the mouthpiece paper in nonslipping relation thereto.
FIG. 13 represents a side elevation view of the mechanism forming part of the cigarette filter tip making apparatus of this invention whereby the action of the granular adsorption-type filter material injection mechanism thereof may be either advanced or retarded to maintain it in proper synchronism with the flow of fibrous, entrainment-type filter elements through the apparatus.
FIG. 14 represents a schematic plan view of the mechanism shown in FIG. 13.

Ledger 88 is reciprocally moved in timed relationship to the cutting action of first cutter 22 of which it forms a part, and in a direction to maintain the cut elements 26 in axial alignment. As rod 24 is advanced and cut into elements 26, each cut element is successively pushed into and through the ledger passageway by the following element and/or the leading end of the uncut rod of fibrous filter material. An advancing element proceeds until it encounters spring finger 93, and its advancement is momentarily stopped thereby while following elements are urged into a solid row. Cutting of elements 26 off of rod 24 takes place at about the middle of the ledger's forward (left hand) stroke, and cut filter elements are released from the ledger, that is, pushed out from under spring finger 93, at about the middle of the ledger's backward (right hand) stroke. Released elements 26 are deposited directly onto mouthpiece paper strip 72. Each released element at its actual moment of release is somewhat too far spaced in back of the element just ahead of it on paper strip 72, and this spacing is closed up to the proper distance by the ledger pushing against the element on the ledger's next forward stroke with its, the ledger's, lower lip, and sliding the fibrous filter element to the left along the moving paper strip.

The three-section filter assembled by the apparatus of this invention requires that predetermined spaces for filling by other filter material such as granular charcoal be provided between consecutive cellulose acetate filter elements 26 as delivered by cutter 22. As exemplified, each filter element 26 is cut to a predetermined accurate length which may be fifteen millimeters, and may be fed from cutter 22 at a rate of fifteen hundred pieces per minute requiring that rod 24 be advanced at a rate of twenty-two thousand five hundred millimeters or twenty-two and one-half meters per minute. It is further contemplated that the space between advancing fibrous filter elements may be one-third the length of an element or five millimeters, and is provided by causing the elements to be accelerated as they are placed on the advancing mouthpiece paper 72. Accordingly, belt 46 and paper 72 are caused to be moved at a rate one-third greater than the advancing rate of the rod 24 which in the example above requires a belt speed of thirty-thousand millimeters or thirty meters per minute.

A slide plate 94 having the ends thereof shaped to fit in close proximity to the respective peripheries of pulleys 48 and 60 is mounted on the base 20B so as to furnish a tangential belt-carrying surface between the pulleys. A short distance from pulley 60 there is attached to plate 94 a pair of troughing side members 95 and 95' which terminate at a point shortly before the pulley 48. The channel formed by plate 94 and side members 95 and 95' has nearly the first half thereof adapted and used to form the belt and paper into an open-topped U containing the spaced elements 26. Means to hold these elements in axial alignment while pressing thereon so as to urge the belt and paper into and against the sides and bottom of the channel are provided by a pair of spaced hold-down belt members 96. These members, as seen in FIGS. 1 through 5, 12 and 15 are preferably of metallic spiral spring construction formed into endless belts and are carried by a grooved driver pulley 98 and grooved tail pulley 99. Grooved pulley 98 is mounted on a shaft 100 carried by a base mounted bearing block 101 and driven by means to be herinafter described.

Figures 7, 8, 15, 16, 17, 19:
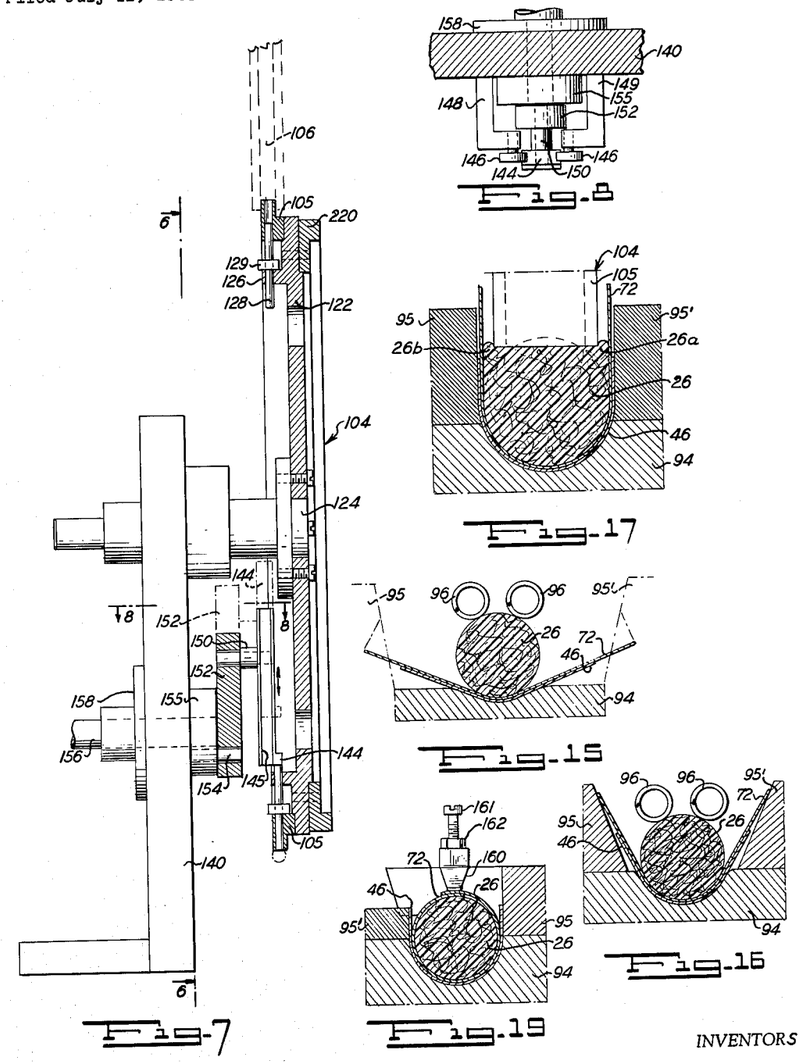
FIG. 7 represents a view in side elevation, partly in section, of the radially chambered wheel and chamber plunger and plunger operating mechanism constituting part of the injection mechanism shown in FIG. 3.
FIG. 8 represents a view in sectional plan of the mechanism shown in FIG. 7 taken along line 8—8 therein looking in the direction of the arrows and showing particularly the guidance means for the hammer element of the plunger operating mechanism.
FIGS. 15, 16, 17, 18, and 19 represent consecutive views in transverse sectional elevation through the mouthpiece paper conveyor belt and guide mechanism of the cigarette filter tip making apparatus of this invention taken respectively at stations 15, 16, 17, 18 and 19 in FIG. 1 looking in the direction of the arrows.

The transition of the belt and paper from a flat to a U-shaped condition is shown in FIGS. 1, 15, 16 and 17. At station 15 as seen in FIG. 1 and fragmentarily and sectionally shown in FIG. 15 the belt 46 rests on slide plate 94 and is ready to enter the channel formed by side members 95 and 95'. The edges of the belt are canted upwardly and inwardly toward the inner walls of side members 95 and 95' and are shown in phantom outline. Further down the channel at station 16 (FIG. 1) as shown in FIG. 16, conveyor belt 46 and paper 72 are now approaching the U-form, while the spring belts 96 are still engaging spaced elements 26 and holding down the fibrous filter elements, conveyor belt, and paper in the channel and assisting in the even forward movement of these items. At station 17 (FIG. 1) still further down the channel and shown sectionally and fragmentarily in FIG. 17 is the location whereat the granular filter material is injected into the separation space between successive fibrous filter elements 26. At this stage of operation the belt and paper are in a U-form within the channel; two exemplary fibrous filter elements have been advanced past the hold-down belts 96, and these two elements are now under a radially chambered wheel 104 having a rim portion 105 whose outer periphery is arranged to contact and flatten slightly the upper portions of the two filter elements 26 in question and, of course, all succeeding fibrous filter elements. The flattening of these elements causes portions thereof to move outwardly and upwardly forming portions 26a and 26b which provide sealing contact with the face of wheel rim 105. Quantitatively, a fibrous filter element 26 having a diameter of $5/16$ in. should be flattened about 0.030 in., that is, about ten percent of its diameter.

The mechanism of the present invention for injecting granular adsorption-type filter material, of which mechanism wheel 104 is a part, is best seen in FIGS. 1 and 3 through 8, and includes a material hopper 106 having a cover 107, a filling gate 108 which has an inlet slide valve having a control system including an air cylinder 110 connected by arm 111 to valve rod 112. The valve control is actuated by means (not shown) energized by an electric eye system having level sensing points 114 (FIGS. 1 and 6) providing both upper and lower limits to the level of granular charcoal 116 in the hopper. The granular material is fed and controlled so as to lie against one end of and extending therefrom to a point intermediate the ends of the hopper. To provide means for the machine operator to check visually on the granular material level and movement thereof, the sides 118 of the hopper are preferably made of transparent material such as an acrylic plastic. The hopper is adapted to fit snugly to rim 105 with appropriately formed seals permitting wheel 104 to rotate so that the moving outer periphery of its rim 105 is presented to the hoppered charcoal. Within rim 105 are a plurality of equally-spaced radially disposed holes 120 which, as exemplified, are sixty in number. Rim 105 is mounted on a hubbed web plate 122 carried by a shaft 124. Mounted on plate 122 is a retaining ring 126 concentric with rim 105 having a like number of equally spaced holes 127 each aligned with a corresponding hole 120.

A plunger 128, having intermediate its ends a shoulder 129, is slidably mounted in each pair of holes 120 and 127 with the shouldered part between rim 105 and ring 126. The shoulder and plunger, as exemplified, are so arranged that when shoulder 129 is urged into engagement with rim 105 the outer end of the plunger is substantially flush with the outer periphery of the rim. This position of the plunger is called the "expelled" position. At the other or inner limit of plunger motion, shoulder 129 is urged against ring 126. This is called the "retracted" position of the plunger. The outer end of plunger 128 is a predetermined distance within the rim and provides the bottom of a cylindrical loading chamber of determinate volume. With the plunger in its retracted position, the rim is moved in way of the hopper from which granular material 116 flows by gravity into the loading chamber. Where charcoal is the granular material to be loaded, a grain size in the range of 12 by 40 mesh is preferred.

Figure 6:
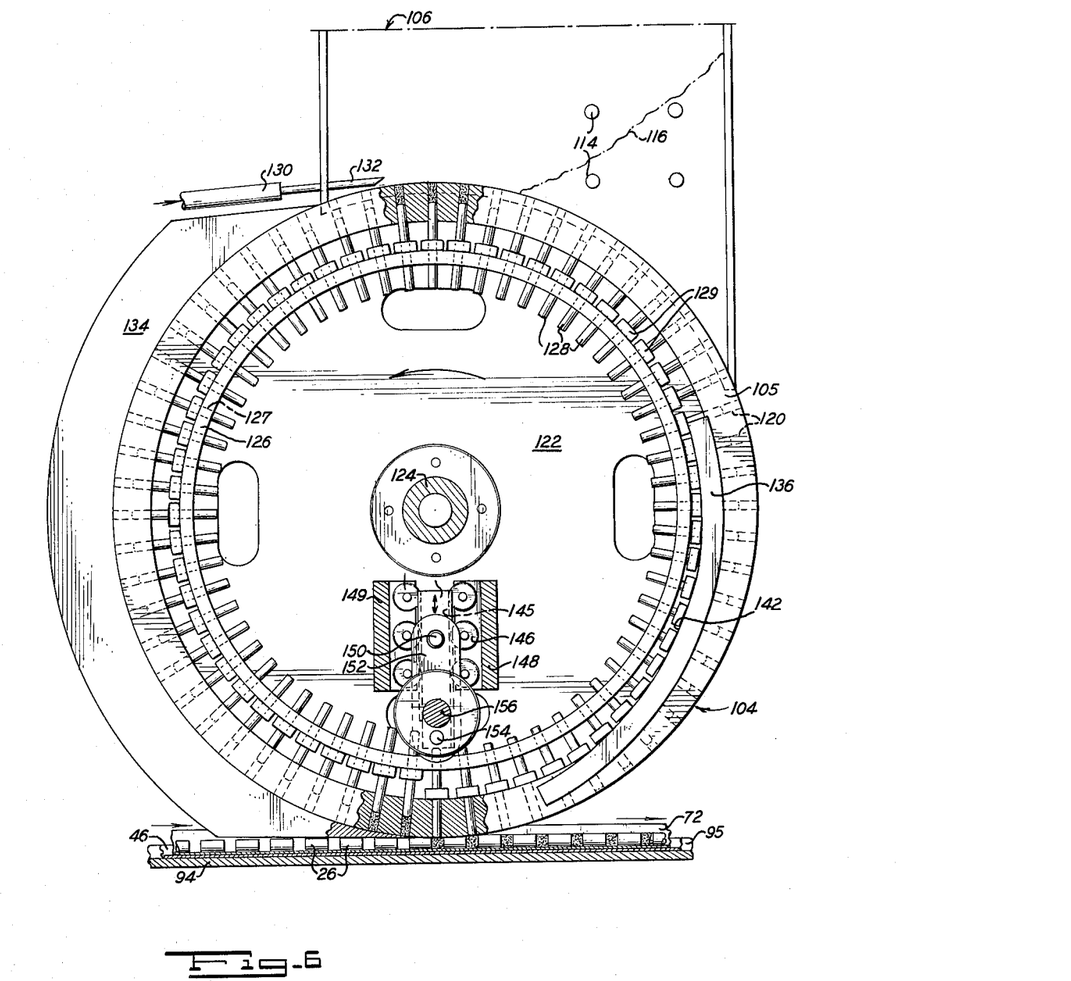
FIG. 6 represents a view in rear elevation of the radially chambered wheel and chamber plunger and plunger operating mechanism constituting part of the injection mechanism shown in FIG. 3, this view being taken along line 6—6 in FIG. 7 looking in the direction of the arrows.

Intermediate the ends of the hopper, rim 105 emerges from below the pile of granular material 116 which, as seen in FIGS. 1 and 6, has a more or less triangular configuration in the hopper. Two general conditions with respect to the pile itself, assuming it to be a charcoal pile, should obtain for satisfactory filing of successive chambers in wheel rim 105. The first of these is that the leading lower edge of the pile (right hand corner as seen in FIG. 1) stop short of a vertical diametral line through wheel 104. The second of these is that the apex or top corner of the pile lie on a diametral line through wheel 104 approximately 45° off of a vertical diametral line.

After emerging from below the pile of granular material 116 but while still in way of the hopper, the periphery of rim 105 is freed of residual granular material, i.e., residual charcoal, by means of an air jet cleaner. This cleaner uses pressurized air delivered by a hose 130 attached to a tubular nozzle 132 mounted in an end wall of hopper 106 so as to direct the emerging air blast tangetially against the approching rim. The velocity of the air emerging from the nozzle may be varied by a pressure regulator 133 providing therewith means to adjust the jet cleaner to suit variable conditions such as humidity and the particles size of granular filter material 116.

The cleaned rim 105 with granular material 116 filling its successive loading chambers moves from the hopper, and the rim periphery is brought into a very close and/or sliding or rubbing contact with an accurately fitted retaining shroud 134. This shroud extends from a point adjacent the hopper to a point quite near a vertical diametral line through the rim. It is to be noted that the lower portion of the shroud 134 is shaped so as to permit the cut fibrous filter elements 26 to be carried in close proximity to its under surface. The closely-fitting inner surface of shroud 134 provides means for the filled loading chambers of rim 105 to be moved from the hopper to a bottom discharge location without any spillage of the granular contents of the chambers.

As each loaded chamber leaves the shroud 134 it is positioned over a void space between sequential elements 26 and the granular material such as activated charcoal in the chamber is driven from it by rapid downwardly driven movement of plunger 128. This downward movement of the plunger is halted by the engagement of shoulder 129 with the inner surface of rim 105 and, in this expelled position with the plunger outer end flush with the rim, the rim is moved for a short distance more in its rotation cycle. A retracting cam 136 mounted by a bracket 138 (FIG. 3) to a base supported angle member 140 has an arcuate inner surface 142 disposed to engage the outer surface of shoulder 129 at a point approximately thirty degrees beyond the aforementioned bottom discharge location. Surface 142 is disposed and configured to cam successive plungers 128 into retracted position with their shoulders 129 against ring 126. As seen somewhat diagrammatically in FIG. 6 this move to the retracted position is completed at or near a point ninety degrees beyond the discharge location with cam 136 continuing to engage plunger shoulders 129 until successive chambers in the rim nearly reach the hopper, at which point the cam is terminated and the rim comes in way of the hopper with successive plungers in the retracted position.

The mechanism for imparting the rapid downward movement of the plunger to the expelled position is best seen in FIGS. 3, 6, 7, and 8 wherein a rectangular member 144 has one end hardened and formed into a hammer face, this member for convenience being designated as the "hammer." Each of the narrower vertical sides of hammer 144 has a channeled track 145 formed therein adapted to engage and retain in rolling contact the rim of a roller 146. A plurality of rollers 146 are arranged in spaced alignment on each side of the hammer so as to be engaged in each track 145 to permit the hammer to be moved freely and guidedly in a vertical reciprocal movement. The rollers 146 are preferably antifriction bearings, and are mounted on oppositely disposed L-members 148 and 149 attached to angle member 140. Extending from the back side of hammer 144 is a wristpin 150 pivotally mounted in a bearing seat in the upper end of a pitman arm or connecting rod 152. The lower end of the pitman arm 152 is mounted on the journal of a crank pin 154 extending from a flange end 155 of a shaft 156 journaled in angle member 140. A thrust bearing flange 158 mounted on shaft 156 assists in retaining the shaft in place in member 140.

To reciprocate the hammer 144, shaft 156 is rotated one revolution, crank pin 154 moving pitman arm 152 and pin-connected hammer 144 upwardly to the position shown in phantom outline in FIG. 7. The downward striking movement occurs when the crank pin 154 moves to the down position shown in FIGS. 6 and 7. In an actual reduction to practice of this invention, the eccentric throw of crank pin 154 has a radius of nine-sixteenths inch resulting in a movement of one and one-eighth inches of hammer 144. The movement of plunger 128 from a retracted position to an expelled position is seven-sixteenths of an inch. This arrangement requires that only about twenty percent of the rotational movement of the crank pin be used in the hammer blow action and that twenty percent of this movement be used to move the hammer into clearance above the next plunger coming into discharge or injection location. This proportioning of the crank pin and hammer movement permits an effective rapid blow to be made on a given plunger and a subsequent retracting or lifting of the hammer into position for the blow to the following plunger.

Referring again to FIGS. 1 and 6, fibrous filter elements 26 as they are carried past the inner lower edge of charcoal retaining shroud 134 are brought successively into contact with rim 105 and are slightly compressed thereby as shown in FIG. 17 described above. In the present instance, the cut filter elements 26 are assumed to be of about five-sixteenths-inch diameter and to be flattened about thirty-thousandths of an inch from their original circular form. The momentary deforming and flattening produces a seal between the fibrous filter elements and rim 105 sufficient to avoid uncontrolled escape of granular material 116 as it is expelled from the loading chamber in the rim into the void between adjacent elements 26. Into a void formed by a five-millimeter spacing between adjacent elements 26, an amount of ninety to one hundred milligrams of charcoal of twelve to forty mesh may be injected with the outer end of a plunger 128 leveling and slightly packing the granular material a predeterminedly desired amount. As each fibrous filter element 26 is moved forward from the discharge or injection location, the simultaneously moving rim 105 rises from this element permitting it to return to its original configuration now slightly above the level of the injected material 116 thereby providing an effective barrier against movement of the injected granular material from the now filled void once existing ahead of the succeeding element 26.

Figures 18, 20:
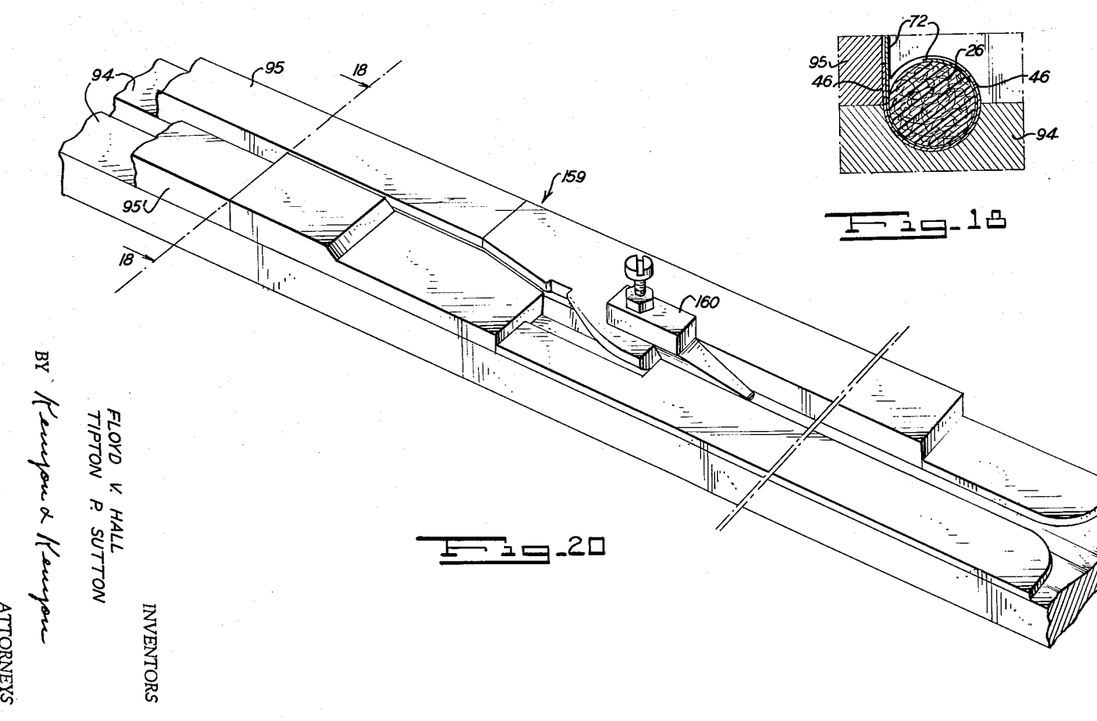
FIG. 20 represents a rear perspective view of the garniture section of the mouthpiece paper conveyor belt and guide mechanism of the cigarette filter tip making apparatus of this invention.

As the series of fibrous filter elements 26, the charges of granular material 116 between these elements, and the mouthpiece paper 72 directly conveying and partly surrounding both the fibrous and granular filter materials all advance from the discharge or injection location directly below wheel rim 105, they enter the garniture section of the apparatus, this section designated 159 being shown particularly in FIG. 20. In this section, which by itself constitutes an apparatus or structure well known to the art, the upwardly extending edges of the mouthpiece paper are turned inwardly and downwardly to form paper strip 72 into an overlapped tubular shape fully enclosing the spaced series of fibrous filter elements 26 and the adsorptive granular filter material 116 filling the spaces between them.

The back edge of mouthpiece paper strip 72 is folded over first by action of side member 95'. A condition of this edge being folded while the front edge is still running in a straight, upright condition exists, substantially at station 18 shown in FIG. 18. Subsequently, of course, the front edge of the paper is turned down on top of the back edge by action of side member 95 or an extension thereof. With mouthpiece paper strip 72 being wider than conveyor belt 46, overlapping of the paper strip can take place without any overlapping of the belt.

The front and back edges of the mouthpiece paper strip are thereafter maintained in overlapped condition by action of a finger element 160 which is affixed to a lateral extension of side member 95 by means of a screw 161 and lock nut 162. The action of finger 160 may be seen particularly clearly in FIG. 19 which is a view at station 19 taken looking "upstream," that is, oppositely to the direction of motion of conveyor belt 46. With finger 160 exerting pressure on the edges of the mouthpiece paper at their overlap, belt 46 may be allowed to fold out away from the paper without the paper itself unwrapping away from its filter materials contents. Such out-folding and eventual flattening of the conveyor belt is, of course, necessary in order that the belt run smoothly over pulley 48.

Figure 2:
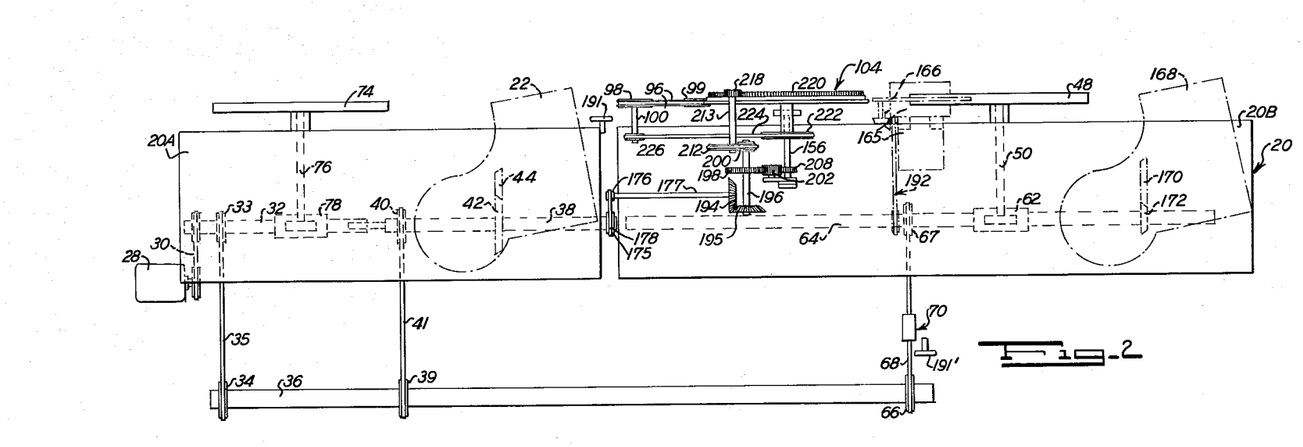
FIG. 2 represents a partly structural and partly schematic plan view of the cigarette filter tip making apparatus of this invention particularly showing the drive system of the apparatus but for simplicity and clarity omitting the drive synchronizing mechanism shown in FIGS. 13 and 14.
Figure 3:
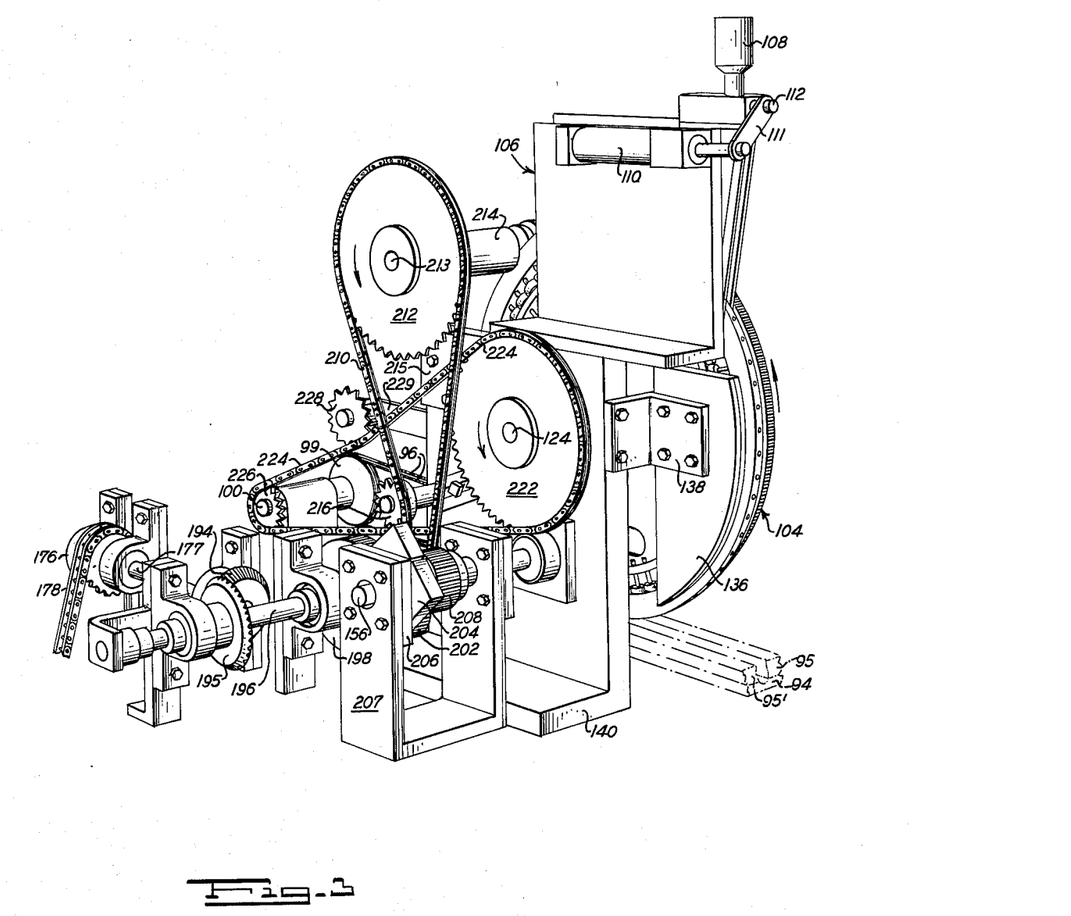
FIG. 3 represents a rear perspective view of the granular adsorption-type filter material injection mechanism of the cigarette filter tip making apparatus of this invention.
Figure 4:
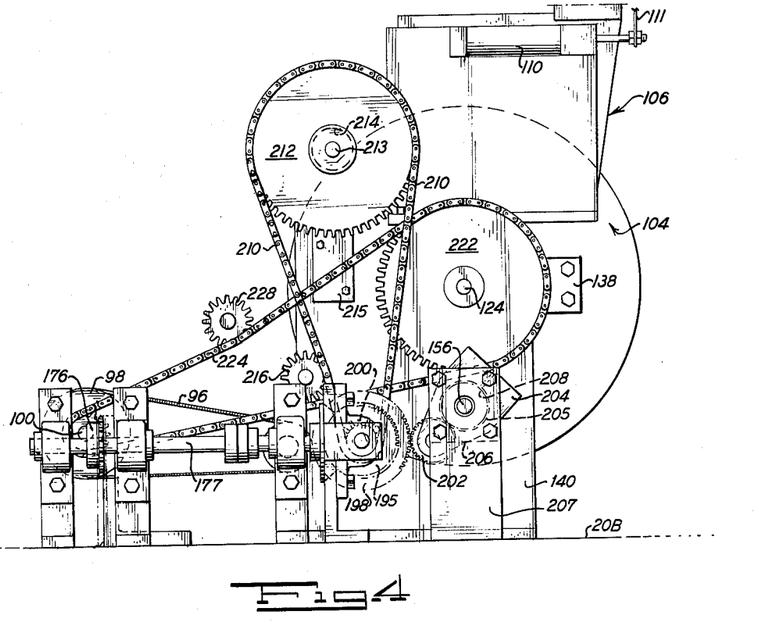
FIG. 4 represents a view in rear elevation of the injection mechanism shown in FIG. 3.
Figure 5:
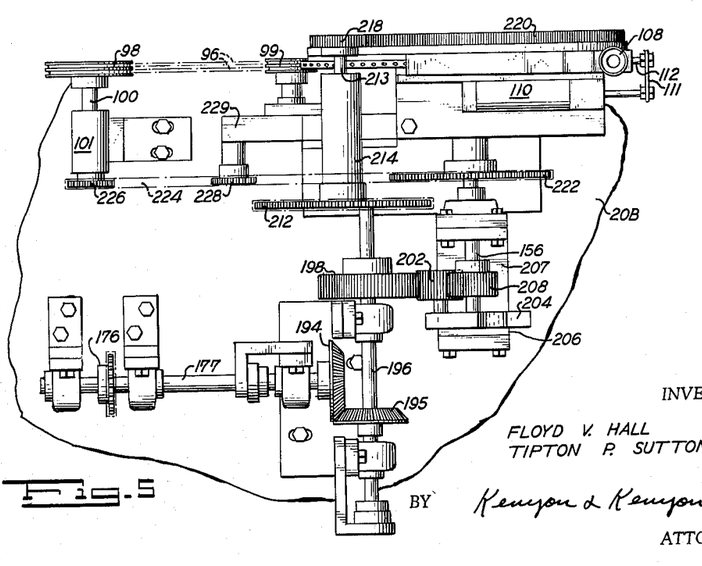
FIG. 5 represents a plan view of the injection mechanism shown in FIG. 3.

Very shortly after the paper 72 has been wrapped into an overlapped tube it is sealed so as to form a continuous rod of filter assemblies. As used in the apparatus of the present invention, the mouthpiece paper 72 is of heat-sealable material or is treated to be heat-sealable. A heat sealing unit 165, commercially available, heated by electrical means is pivotally mounted on the base 20B. The pivot mounting provides for the sealing unit to be swung up and away from the conveyor belt channel as shown in FIG. 1, and to be swung down to a preselected position above this channel. The illustrated sealing unit has a thin metallic band 166 mounted on pulleys and driven at the same speed and in the same direction as the conveyor belt 46. When sealing unit 165 is in its lowered position as indicated in FIG. 2, metallic band 166 is disposed to run in contact with the overlapped material of paper strip 72, exerting at least a slight pressure thereupon. The overlapped mouthpiece paper 72 and its contents are now moved on the conveyor belt to and under the heat sealer and the paper strip is sealed by heated band 166 to form a continuous rod of assembled filters of alternate fibrous elements 26 and sections of granular material 116 securely wrapped within the tube of overlapped mouthpiece paper 72. In the present instance this rod of filter material is cut into "plugs" having six times the length of the individual filter assembly desired for each cigarette. This length of plug is selected so as to be readily fed and cut in a later operation by the filter attachment of the cigarette making machine. In FIGS. 1 and 2 there is shown a cutter 168 similar in all respects to the cutter 22 used to produce elements 26 with the exception that cutter 168 is driven at one-sixth the speed of cutter 22, or at one-sixth of fifteen hundred or two hundred fifty plugs per minute, for example. Cutter 168 has a cutter head driven by a bevel gear 170 having sixty teeth and driven in turn by a mating bevel gear 172 having thirty-four teeth and mounted on second power shaft 64. Each plug 174 delivered from cutter 168 is collected for later operations by equipment not shown.

Synchronization of the above described operations, particularly at the operating speeds indicated, is of utmost importance. The drive system of the illustrated apparatus accordingly has been equipped with certain novel timing controls providing therewith the necessary adjustments required for the satisfactory performance in regulated sequence of the various operations of making the three-section filter tip assemblies hereinbefore described.

The spring belt members 96 and the granular filter material injection mechanism are driven by the first power shaft 38 (FIG. 2) through a roller chain drive of an easily synchronizable nature shown in detail in FIGS. 13 and 14. In this drive a roller chain sprocket 175 having thirty-four teeth and mounted on shaft 38 drives a sprocket 176 of fifteen teeth mounted on a shaft 177, the sprockets being connected by a roller chain 178. Mounted on a base-supported pivoted arm 180 is an idler sprocket 181 engaging roller chain 178 on its slack or nonpulling side, this sprocket being urged outwardly by a tension spring 182 having one end adjustably attached to a base-mounted bracket arm 183 and the other end attached to the free or swinging end of pivot arm 180. Mounted on base 20A is a support bracket 184 having a pin 185 pivotally supporting an adjusting arm 186 intermediate the ends of this arm. One end of arm 186 carries an idler sprocket 187 engaging roller chain 178 and the other end carries a pivoted nut 188. A pivoted base-mounted bracket 189 rotatably retains an adjusting shaft 190 having its inner end threaded and engaged in the pivoted nut 188, and having a hand wheel 191 mounted on its outer end.

In operation, the spring 182 maintains a relatively constant tension in the roller chain 178 and acts as a chain take-up. Idler 187 moves in and out in response to the rotation of handwheel 191 and in so moving shortens or lengthens the amount of roller chain between sprockets 175 and 176 in the pulling or left hand run of the chain shown in FIG. 13. As this run of the chain is shortened or lengthened, the angular relationship of one sprocket to the other is changed as sprocket 176 is advanced or retarded with respect to sprocket 175, providing in this manner a precise, smoothly variable timing control between shaft 38 and shaft 177. Importantly, the drive synchronizing mechanism shown in FIGS. 13 and 14 may be adjusted while the apparatus of this invention is in productive operation; that is, no shut down of the apparatus is required for timing control or synchronizing purposes. This allows running adjustment of the timing of the action of the granular adsorption-type filter material injection mechanism to maintain it in proper synchronization with the flow of fibrous entrainment-type filter elements through the apparatus; that is, so that successive loaded chambers in rim 105 are essentially directly above the spaces or voids between successive fibrous filter elements 26 during the brief periods of hammer action or charcoal injection.

In the driving of the conveyor belt pulley 48 and cutter 168, it is desirable to provide a precise timing control 70 for second shaft 64. Accordingly roller chain 68 is run over a spring-loaded idler sprocket and a handwheel controlled idler sprocket arranged to operate in a manner similar to the synchronizing mechanism of FIGS. 13 and 14 described above. Sealer 165 is also mechanically powered by shaft 64, being connected thereto through a roller chain drive 192 having sprockets selected to give the desired speed to the heated metallic sealing band 166.

Referring now to FIGS. 2 through 5 showing the power transmission system of the injecting mechanism, the timed shaft 177 driven by sprocket 176 carries on one end a bevel gear 194 in mesh with a bevel gear 195, both gears having fifty teeth. Gear 195 is mounted on and drives a shaft 196 which also has a spur gear 198 and a sprocket 200 mounted on it. Spur gear 198 has sixty-eight teeth and drives an idler gear 202 mounted on a clamp arm 204 pivotally mounted on a boss 205 formed on boss block 206 bolted to support 207. Idler gear 202 has thirty-two teeth, and is in mesh with spur gear 208 having thirty-four teeth and mounted on shaft 156. Boss block 206 is mounted so as to position boss 205 concentric with shaft 156 thereby enabling the clamp arm 204 to be loosened on the boss and idler gear 202 to be swung out of mesh with gear 198. Gear 198 may then be advanced or retarded a selected number of teeth for timing adjustment, and idler gear 202 swung back into mesh with it and arm 204 reclamped on boss 205. Shaft 196 carries the sprocket 200 and provides the drive for radially chambered wheel 104.

Sprocket 200 has fourteen teeth and drives roller chain 210 passing around sprocket 212 which has sixty teeth and is mounted on rim-drive shaft 213 journaled in bearing block 214 which is immediately supported by bracket 215. Idler sprocket 216 is arranged to engage with and act as a take-up for roller chain 210. On the front end of shaft 213 is mounted a pinion 218 having forty teeth and meshing with and driving ring gear 220 having two hundred and eighty teeth. This ring gear is mounted on the face of and is a part of and receives driving power for radially chambered wheel 104. Shaft 196 drives wheel 104 through sprocket 200 and hammer 144 through gear 198 transmitting power to shaft 156. Precise timing of the radially chambered wheel and the hammer to each other is achieved through adjusted engagement of the teeth of gears 198, 202 and 208.

Web 122 of wheel 104 is mounted on shaft 124 which is carried in a long journal in angle member 140 (FIG. 7), the shaft rotating as the wheel is turned by the rim drive. A roller chain sprocket 222 is mounted on the rear end of the shaft 124 and has sixty teeth engaging and driving a roller chain 224. This chain is connected to and drives a sprocket 226 having fifteen teeth and mounted on one end of shaft 100. An idler sprocket 228 is rotatably mounted on a movable arm 229 so as to engage with and provide a take-up for roller chain 224. Shaft 100 has mounted on its other end the grooved pulley 98 around which pass the spring belts 96.

Figure 10:
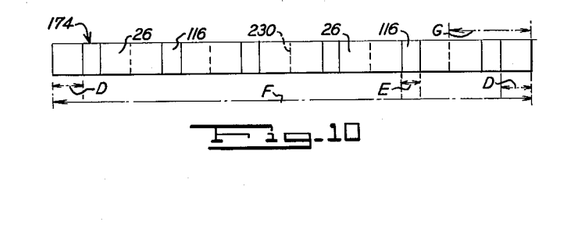

The apparatus embodiment of the present invention particularly described above operates in synchronized relationship to produce a filter plug 174 in which the fibrous filter elements 26 are each fifteen millimeters long and the charcoal-packed spaces between adjacent elements 26 are each five millimeters long. A typical filter plug 174 representing the ultimate product of the illustrated apparatus is shown in FIG. 10. The filter assembly rod movement through the apparatus is synchronized so that cutter 168 cuts each sixth element 26 transversely, at its midlength producing a cellulose acetate portion on each end of the finished filter plug 174, each portion being of seven and one-half millimeters length and designated D. The granular filter portion 116 between elements 26 has a five-millimeter length designated E providing a total length of plug 174 of one hundred twenty millimeters designated F. The filter assembly actually mounted on the end of a finished cigarette has a twenty-millimeter length designated G and is produced by making subsequent secondary cuts 230 in plug 174 at five midlength points of elements 26 by cigarette assembling apparatus not shown and not forming any part of the present invention.

Figure 9:
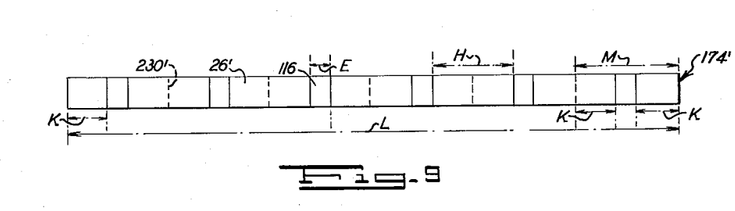
FIGS. 9, 10 and 11 represent partly structural and partly schematic views in side elevation of lengths or segments of assembled filter material produced by the cigarette filte tip making apparatus of this invention, each of these lengths, segments, or assemblies comprising the entire filter material needed for six cigarettes, and differing from one to another in their lengths of sections of fibrous entrainment-type filter material on either side of uniform length sections of granular adsorption-type filter material.

In FIG. 9 is shown a filter plug 174′ generally similar to plug 174 but in which the length of each cellulose acetate or fibrous filter element 26′ has been extended to twenty millimeters and is designated H with the inbetween granular portions 116 each still maintained at a five millimeter length designated E. Each sixth element 26′ running through the apparatus is also cut at its midlength to provide end portions on plug 174′ each having a ten-millimeter length designated K. The overall length of plug 174′ is one-hundred fifty millimeters and designated L. This plug is secondarily cut at the midlengths 230′ of its fibrous filter elements 26′ into filter assemblies for six individual cigarettes, each such assembly having a twenty-five millimeter length designated M. When it is desired to make a shorter filter plug 174″, the arrangement shown in FIG. 11 may be generated in which the fibrous filter elements 26″ each have a twelve millimeter length designated N, and have between one another the five millimeter lengths of granular material 116 designated E. The overall length of plug 174″ is one hundred two millimeters designated S. This plug is secondarily cut at the midlengths 230″ of its fibrous filter elements 26″ into filter assemblies for six individual cigarettes, each such assembly having a seventeen-millimeter length designated T.

Figure 11:
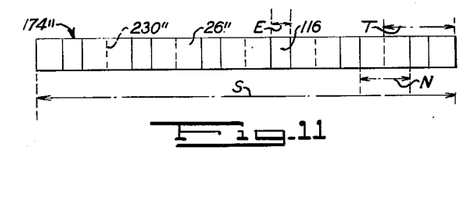

The apparatus described is adaptable to produce any of the filter plugs of FIGS. 9, 10 and 11 and others also while cutting fifteen hundred fibrous filter elements per minute from rod 24. After proceeding through the charcoal or granular filter material injection operation and the sealing of the overlapped mouthpiece paper leading end of the assembled filter rod is cut to produce two hundred fifty plugs per minute. The length of each fibrous filter element is changed by increasing or decreasing the feeding rate of rod 24 with a faster rate producing longer elements 26 and a slower rate producing shorter elements. The speed of paper 72 and belt 46 is adjusted accordingly to provide the amount of acceleration to filter elements leaving first cutter 22 necessary to produce the desired charcoal injection space between succeeding elements. Any desired arrangeemnt of fibrous filter element length and the space in between may be made by appropriate changes of conveyor belt, mouthpiece paper, and cellulose acetate rod speeds. The arrangement of the drive of the main shaft 32 and jack shaft 36 in conjunction with the timing controls to the granular filter material injection mechanism and conveyor belt and the second cutter enables a constant filter spacing and length to be maintained and provides synchronization of both cutting machines. The adjustable mesh combination of spur gears 198, 202 and 208 enables the movement of hammer 144 to be exactly synchronized with the relative position of wheel 104 and the several plungers 128 which it carries.

The cleaning of rim 105 of radially chambered wheel 104 by the air jet cleaner after loading of successive wheel chambers and prior to the upper rim surface coming in way of shroud 134 insures that no charcoal granules will contact the shroud and be powdered. If powdering should occur because of failure to clean the rim the powder may be transferred to the fibrous filter elements 26 making them unsightly, and may be transferred further to the mouthpiece paper 72 and provide a potential difficulty in the sealing of the paper. Even more importantly, the fine powder particles may enter the cellulose acetate elements 26 and partially choke them thereby increasing the filter pressure drop.

The process of producing the final filter product as plugs 174 includes the steps of cutting the cellulose acetate rod 24 at high speed into short elements of precise length; aligning and feeding the cut elements 26 to be delivered to a conveyor means, and accelerating the elements to provide determinate and essentially identical distances therebetween. Further steps include feeding the mouthpiece paper to a conveyor belt; holding the spaced elements in aligned array on the paper and belt thereunder while forming the paper into a U-channel; advancing the spaced elements in relation to a multi-chambered material transporting wheel to present individual void spaces to consecutive ones of such chambers, and injecting granular filter material from these chambers into these voids. Still further steps include forming the mouthpiece paper into an overlapped tube with the filter elements 26 and granular material 116 enclosed fully therein; sealing the overlapped tube to form a rod of alternate types of filter material, and cutting at a lesser speed the sealed rod of filter elements into lengths sufficient to make a plurality of shorter length filter assemblies. Even still further steps in the loading and transferring of the adsorptive granular material include feeding this material from a storage supply to a control gate on a hopper; opening and closing the gate in response to a height regulated signal to replenish the material withdrawn from the hopper; filling each chamber of a chambered wheel rim by presenting the rim to the hoppered material; cleaning the surface of the chambered rim as it emerges from the material to remove residual granular material; slidably contacting the rim with a retaining shroud to maintain the material in the filled chambers while conveying the material from the hopper to an injection location for void spaces between advancing successive fibrous or entrainment-type filter elements, and flattening the top of the fibrous filter elements to effect a seal around the chambered wheel at the time and location of granular material injection.

Figures 21, 22:
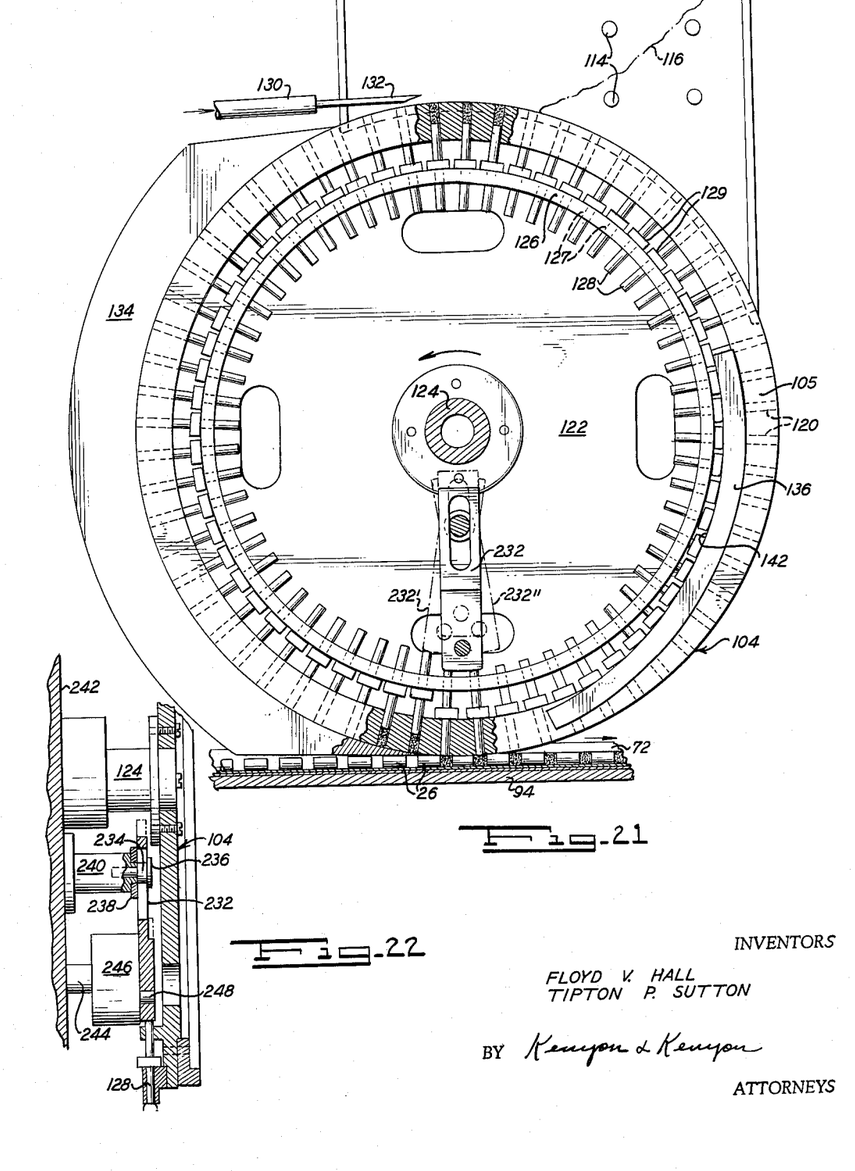
FIG. 21 represents a view in rear elevation of an alternate form of radially chambered wheel and chamber plunger and plunger operating mechanism suitable for use in an injection mechanism forming part of the cigarette filter tip making apparatus of this invention.
FIG. 22 represents a view in side elevation, partly in section, of a fragment of the radially chambered wheel and chamber plunger and plunger operating mechanism shown in FIG. 21.

Referring finally to FIGS. 21 and 22, there is shown an alternate form of radially chambered wheel and chamber plunger and plunger operating mechanism suitable for use in an injection mechanism forming part of the cigarette filter tip making apparatus of this invention. Many of the individual parts used in the earlier-illustrated mechanism of FIGS. 6 and 7 are, however, directly usable in the mechanism of FIGS. 21 and 22, and are designated by the same reference numbers in both groups of figures.

The mechanism of FIGS. 21 and 22 includes a hammer 232 which is slotted vertically at its upper end to allow it to both reciprocate and oscillate with respect to a guide bearing 234. This bearing, which is desirably an antifriction or needle bearing, is mounted by means of a screw 236 which extends through it and through a washer 238 into a horizontal post 240 with which it is in threaded engagement. This post is in turn mounted on and in a support member 242 corresponding to angle 140 in FIG. 7. Retention of hammer 232 on bearing 234 is effected by the wide head of screw 236 which overlies the edges of the slot in the hammer. The axial thickness of bearing 234 is preferably slightly greater than the thickness of the upper end of hammer 232 so that the hammer can both swing and slide freely around and along the bearing after screw 236 has been set up tightly, but without any particular freedom to move in and out between the underside of the head of screw 236 and the outer surface of washer 238.

The drive for hammer 232 is provided through a shaft 244 which extends through and is rotatably mounted in support member 242. This shaft corresponds operationally to shaft 156 shown in FIGS. 3, 4 and 5 wherethrough hammer 144 is driven. Shaft 244 itself is driven by a mechanism (not shown) functionally similar to that driving shaft 156, but having the particular operational differences that shaft 244 is rotated in the direction opposite to that of shaft 156, and, for a given rate of rotation of wheel 104, shaft 244 is turned at half the speed of shaft 156. In this connection the point may be made that shaft 244 must be rotated clockwise as viewed from the front of the apparatus according to FIG. 1 in order to give the correct action of hammer 232 on plungers 128 as explained hereinafter. Shaft 156 on the other hand may be rotated in either direction to give the correct action of hammer 144 on the plungers since this hammer performs only a reciprocating motion and not both a reciprocating and an oscillating motion. The specifically illustrated mechanism for driving shaft 156 does, however, impose a rotation on this shaft which appears counterclockwise as viewed from the front of the apparatus.

Connection between shaft 244 and hammer 232 is made through a crank 246 fixed on the shaft and an offset crank pin 248 fixed in the hammer and extending rotatably into a bearing within the crank. Rotation of shaft 244 causes hammer 232 to move between two extreme positions shown in dashed outline in FIG. 21 and designated 232' and 232". In the course of striking plungers 128 to inject granular material from chambers 120 into spaces between fibrous filter elements 26 the hammer is moved from position 232' to position 232". During this movement the bottom or striking face of the hammer is traveling laterally in the same direction as the upper ends of the plungers being struck, that is, from left to right as seen in FIG. 21.

The plunger operating mechanism of FIGS. 21 and 22 causes two plungers 128 to be struck and driven from retracted inner to expelled outer positions in the course of one revolution of shaft 244, that is, one complete operating cycle of hammer 232. This means that void spaces between successive fibrous filter elements 26 are filled with granular adsorptive-type filter material on essentially a two-at-a-time basis. A greater degree of compression of fibrous filter elements 26 is required for effective sealing against wheel rim 105 during granular material injection when these elements are passed through the mechanism of FIGS. 21 and 22 than when they are passed through the mechanism shown in FIGS. 6 and 7. Quantitatively, a fibrous filter element 26 having a diameter of 5/16 in. should be flattened about 0.068 in., that is, about twenty percent of its diameter.

The mechanism of FIGS. 21 and 22 has certain advantages over that of FIGS. 6 and 7. These derive principally from the fact that for a given rate of rotation of wheel 104 the action of hammer 232 against plungers 128 is considerably gentler than that of hammer 144. Particular advantages therefore include quieter operation, reduced rates of wear of machine parts, longer retention of machine adjustments, and, in general, reduced requirements for machine maintenance. The mechanism of FIGS. 21 and 22 is, accordingly, to be regarded as a preferred mechanism in respect of that shown in FIGS. 6 and 7.

Since certain modifications in carrying out the above process and the constructions set forth which embody the invention may be made without departing from the scope of the invention, it is intended that all matter contained in the foregoing description or shown in the accompanying drawings shall be interpreted as illustrative and not in a limiting sense.

What is claimed is:

1. Apparatus for the production of cigarette filter tips having a multi-sectional internal construction, said apparatus comprising (1) a base, (2) a transporting means carried by the base, said means including a traveling conveyor belt, (3) means for feeding a strip of mouthpiece paper to and onto the traveling conveyor belt for conveyance thereby, (4) means for continuously feeding and successively cutting a rod of entrainment-type, fibrous filter material into equal-length filter elements, and depositing these elements in an axially aligned sequence onto the traveling mouthpiece paper, (5) means for driving and accurately maintaining the speed of the conveyor belt and the mouthpiece paper thereon at a determined speed in excess of the speed of the fibrous filter elements leaving the cutting means for accelerating these elements and providing a determinate space between successive fibrous filter elements as deposited on said mouthpiece paper, (6) means for injecting a charge of granular adsorption-type filter material into each determinate space between successive fibrous filter elements, (7) means for forming and sealing the mouthpiece paper into an overlapped tube fully enclosing and forming a rod-shaped assembly of alternate fibrous filter elements and granular materials, and (8) means for cutting the rod-shaped assembly into successive filter tip assemblies of determinate length.

2. Apparatus according to claim 1 in which the means for injecting a charge of granular material includes (1) a wheel rotatably mounted above said conveyor belt, said wheel being characterized by at least one radial chamber opening through the rim thereof, (2) a plunger mounted on the wheel and slidably movable in said chamber, (3) cooperable means on said plunger and wheel providing stops to limit the movement of the plunger between an expelled outer and a retracted inner position, and (4) means for moving the plunger outwardly at the time of injection of adsorptive-type granular material into the determinate spaces between fibrous filter elements and thereafter returning the plunger to its inner retracted position.

3. Apparatus according to claim 2 in which there is (1) a hopper mounted above said wheel and having an open bottom slidably engaging the wheel rim, said hopper providing for receiving and feeding of the granular filter material, and (2) means for rotating the wheel in way of the hopper for filling each chamber with granular material, and thereafter moving each filled chamber to a bottom discharge location over a determinate space between advancing sequential fibrous filter elements.

4. Apparatus according to claim 3 in which there is (1) rim cleaning means for said wheel mounted on and extending into the hopper for removing the residual granular material from the chamber-filled rim, and (2) a shroud mounted adjacent the wheel and having a surface slidably contacting the rim for holding granular material without spillage in the filled radial chambers of the moving wheel as successive portions of the rim thereof are moved from the hopper to the bottom discharge location.

5. Apparatus according to claim 1 in which the fibrous filter rod material cutting means operates at a given rate of cuts per unit time, and the rod shaped filter assembly cutting means operates at a relative lesser rate of cuts per unit time to cut selectively spaced fibrous filter elements transversely at their midlengths producing successive filter tip assemblies each having a length comprising the entire filter material for at least one cigarette.

6. Apparatus according to claim 5 in which the selectively spaced fibrous filter elements are each sixth fibrous filter element.

7. Apparatus for the production of cigarette filter tips having multi-sectional internal construction, said apparatus comprising (1) means for receiving a continuously advancing rod of fibrous filter material and cutting it at a relatively high rate into a moving stream of fibrous filter elements; (2) transporting means for receiving filter elements from the cutting means in axially aligned sequence and accelerating them to provide determinate spaces between succeeding fibrous filter elements, said transporting means including (i) a conveyor belt transversely formable into a U-shape, (ii) means for longitudinally feeding and guiding onto the conveyor belt a strip of mouthpiece paper, and a pair of troughing side members mounted on a slide plate and defining therewith a channel for forming and guiding the conveyor belt and mouthpiece paper into transverse U-shape containing the spaced cut fibrous filter elements; (3) granular material injection mechanism, said mechanism including (i) means for receiving an individual measured quantity of granular adsorption-type filter material from a supply thereof, (ii) means for transferring this measured quantity of material to a discharge location above said transporting means, and (iii) means for injecting in timed relationship to action of the transporting means the measured quantity of granular material into one of a series of determinate spaces between succeeding fibrous filter elements; (4) a garniture section mounted on and forming an extension of said troughing side members for receiving the transversely U-shaped mouthpiece paper containing alternately fibrous filter elements and granular adsorption-type material and for turning and forming the edges of the paper into contiguous relationship to provide an overlapped mouthpiece paper tube fully enclosing the alternating fibrous filter elements and granular filter materials therewithin; (5) a heat sealing unit situated adjacent said conveyor belt beyond said garniture section and disposable to bear upon and heat the overlapped mouthpiece paper and join the edges thereof into a tube defining a rod-shaped filter assembly of alternating inner construction; and (6) cutting means for receiving and cutting the rod-shaped filter assembly into successive filter tip assemblies of determinate length comprising the entire filter material for at least one cigarette.

8. Apparatus according to claim 7 which further comprises at least one spring belt mounted above said transporting means before said granular material injection mechanism and moving in timed relationship to said conveyor belt to engage the upper surfaces of cut fibrous filter elements and maintain said elements in spaced alignment on the mouthpiece paper on and moving with said conveyor belt.

9. Apparatus according to claim 7 which further comprises synchronizing means for adjusting the timed relationship between the injecting of the granular adsorptive-type filter material and the action of the transporting means carrying the fibrous filter elements, said synchronizing means including (1) a chain drive between said transporting means and injection mechanism with driver and driven sprockets connected by a roller chain, (2) tensioning means for maintaining a relatively constant tension in the chain, and (3) means for changing the length of the pulling side of the chain between the driver and driven sprockets.

10. Apparatus according to claim 7 in which said injection mechanism particularly includes (1) a radially chambered wheel, (2) a shroud slidingly contacting the wheel for holding granular material without spillage in the chambers thereof as the filled chambers are moved from receiving location to discharge location by rotation of said wheel, (3) plunger means movable in the chambers of said wheel for expelling granular material therefrom into successive ones of the determinate spaces between fibrous filter elements, and (4) means for driving successive plungers rapidly downwardly into expelled position.

11. Apparatus for the production of cigarette filter tip assemblies having cut fibrous filter elements separated by determinate distances filled with granular filter material, said apparatus comprising (1) a base, (2) a first cutter mounted on said base for cutting a rod of fibrous filter material into consecutively equal length filter elements, (3) transporting means carried by the base, said means including a traveling conveyor belt, (4) a support guide and delivery means mounted on the base for feeding a strip of mouthpiece paper to and onto the conveyor belt, (5) a spring-fingered, cutter-mounted ledger for depositing said cut fibrous filter elements onto the traveling mouthpiece paper in axially aligned and longitudinally spaced array, (6) a pair of movable spring belts mounted above the transporting means engaging the cut fibrous filter elements to hold said elements in spaced alignment on the mouthpiece paper traveling with the conveyor belt, (7) means for forming the traveling mouthpiece paper into a transverse U-shape containing the spaced fibrous filter elements, (8) a radially-chambered wheel rotatably mounted above the transporting means, said wheel having material carrying chambers circumferentially spaced therein, (9) means for filling each chamber of the wheel with granular adsorption-type filter material from a supply thereof, (10) means for rotating said wheel to transfer each granular material filled chamber from said supply to a discharge location above said spaced array of fibrous filter elements, (11) means for injecting the granular material contained in successive chambers into successive spaces between fibrous filter elements, (12) means for forming and overlaying the edges of the mouthpiece paper into an overlapped tube fully enclosing the alternating fibrous filter elements and granular filter material therein, (13) a heat sealing unit situated adjacent the conveyor belt and having a heated surface adapted to press lightly upon and seal the overlapped edges of the mouthpiece paper and thereby define a rod-shaped filter assembly of alternating inner construction, and (14) a second cutter mounted on said base and adapted to receive and cut the rod-shaped filter assembly into successive filter tip assemblies of determinate length comprising the entire filter material for at least one cigarette.

12. Apparatus according to claim 11 which further comprises synchronizing means for maintaining the second cutter in such timed operating relationship to the first cutter and the conveyor belt to cut selectively spaced fibrous filter elements transversely at their midlengths producing successive filter tip assemblies each having a length comprising the entire filter material for at least one cigarette.

13. Apparatus according to claim 11 which further comprises a drive system including (1) means for driving a first power shaft at a selected rate of speed, (2) means for driving the first cutter from the first power shaft, (3) means for driving from the first power shaft a mechanical power transmission system for driving the injecting mechanism and the spring hold-down belts, (4) means for varying the rotational relationship of the first power shaft to said mechanical power transmission system for synchronizing the operations of the first cutter and the injecting mechanism, (5) means for driving a second power shaft at a selected rate of speed in timed relationship to the first power shaft, (6) mechanical power transmitting means from the second power shaft to the transporting means for driving the conveyor belt, (7) means for driving the second cutter from the second power shaft, and (8) means for varying the rotational relationship of the second power shaft to the first power shaft for synchronizing the operations of the first and second cutters.

14. Apparatus according to claim 13 in which the means for varying the rotational relationship of the first power shaft to the mechanical power transmission system and of the second power shaft to the first power shaft each include a chain drive assembly having (1) a driver sprocket, (2) a driven sprocket, (3) a roller chain connecting said driver and driven sprockets, (4) a spring-biased idler sprocket engaging the roller chain on its non-pulling side and bowing the chain to maintain a relatively constant tension therein, and (5) a controllably movable idler sprocket engaging the chain on its pulling side intermediate the driver and driven sprockets whereby the length of the pulling side of the chain in between these sprockets may be changed to vary the rotational relationship of the driver and driven sprockets.

15. Apparatus according to claim 11 which further comprises a drive system including (1) a motor, (2) a jack shaft driven by a first mechanical power transmitting means from the motor, (3) a first power shaft driven by and connected to the jack shaft by second mechanical power transmitting means, (4) a gear mounted on the first power shaft and driving the first cutter, (5) a mechanical power transmission system for driving the injecting mechanism and hold-down belts, (6) a first chain drive assembly connecting the first power shaft and said mechanical power transmission system, said assembly including means for varying the angular relationship of said first power shaft and said mechanical power transmission system, (7) a second power shaft driven by and connected to the jack shaft by a second chain drive assembly, said assembly including means for varying the angular relationship of said jack shaft and second power shaft, (8) a gear transmission from the second power shaft connected to and driving said transporting means, and (9) a gear mounted on the second power shaft driving the second cutter.

16. Apparatus according to claim 15 in which said first and second chain drive means for varying the angular relationships of the first power shaft and mechanical power transmission system and the jack shaft and second power shaft each include (1) a driver sprocket, (2) a driven sprocket, (3) a roller chain connecting said driver and driven sprockets, (4) a first idler sprocket mounted on a spring-biased first base-supported and pivoted arm, said idler sprocket engaging the chain on its non-pulling side and being urged by the spring-bias to bow the chain and thereby maintain a desired tension in the chain, (5) a second idler sprocket mounted on a second base-supported and pivoted arm and engaging the chain on its pulling side intermediate the driver and driven sprockets, and (6) a screw adjusting means for controllably moving said second arm and idler sprocket to change the length of the pulling side of the chain in between the driver and driven sprockets for varying the angular relationship between these sprockets.

17. A granular material injection mechanism for use in the production of cigarette filter tips having multi-sectional internal construction, said mechanism comprising (1) a rotatably mounted wheel having at least one radial hole opening through its rim, said hole at least partly defining a granular material loading chamber, (2) a plunger mounted on said wheel and slidably movable in said radial hole, (3) cooperable means on said plunger and wheel providing stops to limit movement of said plunger between an expelled outer and a retracted inner position, (4) shroud means extending in close fitting relationship around a portion of said wheel rim for preventing spillage of granular material from said chamber, said shroud means having an end thereof at a point near the vertical diametral line of said wheel, (5) means operative adjacent said end of said shroud means for rapidly moving the plunger outwardly to its expelled position at the time of injection of granular material from said chamber into other cigarette filter tip structures and (6) means for thereafter returning said plunger to its retracted inner position.

18. A granular material injection mechanism according to claim 17 in which the cooperable means on the plunger and wheel includes (1) an inner retaining ring concentrically mounted on said wheel, said ring having at least one radial hole axially aligned with the radial hole in the rim, the plunger being slidably retained in the axially aligned rim and ring holes, and (2) a collar-like, oppositely surfaced shoulder formed on the plunger intermediate its ends and disposed between rim and ring, said shoulder bearing against the rim in the expelled outer position of the plunger and against the ring in the retracted inner position of the plunger.

19. A granular material injection mechanism according to claim 18 in which the means for rapidly moving the plunger outwardly for the injection of granular material includes (1) a reciprocably movable hammer member having a face formed on one end for striking the inner end of the retracted plunger and pushing said plunger to its expelled outer position, (2) bearing means for laterally retaining and guiding said hammer member during its reciprocation, (3) a wrist pin attached to and extending from one side of the hammer member, (4) a pitman arm having one end journaled on and driving the wrist pin, and (5) a crank pin journaled in and driving the other end of said pitman arm, and (6) a shaft driven rotationally in timed relation to the rotation of said wheel, said crank pin being mounted eccentrically on said shaft.

20. A granular material injection mechanism according to claim 18 in which the means for returning the plunger from its expelled outer to its retracted inner position includes a retracting cam having an arcuate inner surface disposed to engage the outer surface of said plunger shoulder, said arcuate surface having its leading end located just outside a path defined by the outer surface of the plunger shoulder as the wheel is rotated with the plunger in expelled outer position and its rear end located adjacent a path defined by the outer surface of the plunger shoulder as the wheel is rotated with the plunger in retracted inner position.

21. A granular material injection mechanism according to claim 17 which further comprises (1) a hopper mounted above said wheel and having an open bottom slidably engaging the wheel rim, said hopper providing for receiving and feeding of granular filter material, (2) means for rotating the wheel in way of the hopper for filling said chamber in the wheel with granular material and thereafter moving said filled chamber to a bottom discharge location, and (3) rim cleaning means for said wheel mounted on and extending into the hopper for removing residual granular material from the rim after filling of said chamber.

22. A granular material injection mechanism according to claim 21 which further comprises (1) a filling gate including a valve mounted on said hopper, (2) granular material level sensing means positioned on and in said hopper, and (3) power means for opening and closing said gate by actuating said valve in response to signals generated by said level sensing means.

23. A granular material injection mechanism according to claim 22 which is adapted to maintain a substantially triangularly configured pile of granular material in said hopper, said pile having a leading edge in the direction of motion of said wheel rim stopping short of a vertical diametral line through said wheel and having further an apex lying on a diametral line through the wheel approximately 45° off of a vertical diametral line.

24. A granular material injection mechanism for use in the production of cigarette filter tips having multi-sectional internal construction, said mechanism comprising (1) a rotatably mounted wheel having a plurality of radial holes opening through its rim, said holes at least partly defining a plurality of granular material loading chambers, (2) a plurailty of plungers mounted on the wheel and slidably movable in said radial holes, (3) cooperable means on said plungers and wheels to limit the movement of said plungers between expelled outer and retracted inner positions, (4) means for rapidly moving the plungers outwardly at the times of injection of granular material from their respective chambers into other cigarette filter tip structure and (5) means for thereafter returning the plungers to their retracted inner positions, said means for moving the plungers outwardly for the injection of granular material including (6) a reciprocably and oscillatably movable hammer member having a face formed on one end for striking the inner end of at least one retracted plunger in the course of a single operating cycle of said hammer and pushing said plunger to its expelled outer position, (7) bearing means with respect to which said hammer member can both reciprocate and oscillate, (8) a crank pin attached to and extending from one side of the hammer member, (9) a crank having one end journaled on and driving said crank pin, and (10) a shaft driven rotationally in timed relation to the rotation of said wheel, said crank being mounted on said shaft to render said crank pin eccentric with respect to said shaft.

25. A granular material injection mechanism according to claim 24 in which said hammer member is adapted to strike the inner ends of a plurality of retracted plungers in the course of a single operating cycle of said hammer and push these plungers to their expelled outer positions.

26. A granular material injection mechanism according to claim 24 in which said hammer member is adapted to strike the inner ends of not more than two retracted plungers in the course of a single operating cycle of said hammer and push these plungers to their expelled outer positions.

27. A process for assembling a continuous rod of alternating fibrous and granular filter material, said process comprising the steps of (1) feeding a strip of mouthpiece paper onto a traveling conveyor belt, (2) delivering onto the paper at timed intervals a succession of aligned fibrous filter elements of equal length, (3) accelerating the delivered fibrous filter elements on and by said traveling belt and paper to provide determinate and essentially identical spacing between successive fibrous filter elements, (4) holding the spaced fibrous elements in aligned array traveling on the paper and belt thereunder while forming the mouthpiece paper into a U-shape, (5) advancing the spaced elements in relation to a multi-chambered material transporting wheel to present successive spaces between fibrous elements to successive ones of such chambers, (6) injecting granular filter material from these chambers into these spaces, (7) forming the mouthpiece paper into an overlapped tube with the successive fibrous filter elements and granular filter material enclosed fully therein, and (8) sealing the overlapped tube to form a rod of alternating types of filter material.

28. A process for loading, feeding, transferring and injecting granular material into a void between traveling fibrous filter elements of determinate spacing, said process comprising the steps of (1) feeding granular material from a storage supply to a control gate on a hopper, (2) opening and closing said gate in response to a height regulated signal to replenish the material withdrawn from said hopper, (3) filling each chamber of a chambered wheel rim by presenting the rim in way of the hoppered material, (4) cleaning the surface of the chambered rim as it emerges from the material to remove residual granular material therefrom, (5) slidably contacting the rim with a retaining shroud to maintain the material in the filled chambers while transporting the material from the hopper to an injection location for void spaces between advancing successive fibrous entrainment-type filter elements, (6) flattening the top of the fibrous filter elements to effect a seal around the chambered wheel at the time and location of granular material injection, and (7) injecting the granular material from successive ones of the chambers into successive ones of the void spaces between advancing elements.

29. A process according to claim 28 in which (1) said fibrous filter elements are of cylindrical form having a diameter of about 5/16 in., and travel axially, (2) said fibrous filter elements are flattened diametrally by about 0.030 in., and (3) the injection of granular material from successive ones of said chambers takes place on a one-at-a-time basis.

30. A process according to claim 28 in which (1) said fibrous filter elements are of cylindrical form having a diameter of about 5/16 in., and travel axially, (2) said fibrous filter elements are flattened diametrically by about 0.068 in., and (3) the injection of granular material from successive ones of said chambers takes place on essentially a two-at-a-time basis.

31. A process for making cigarette filter tip assemblies of alternately fibrous and granular filter material, said process comprising the steps of (1) cutting rod-shaped fibrous filter material into short elements of consecutively equal lengths, (2) aligning and feeding the cut fibrous elements to be delivered to a transporting means having a traveling conveyor belt, (3) feeding a strip of mouthpiece paper onto said belt, (4) receiving and accelerating the cut fibrous filter elements on the traveling conveyed mouthpiece paper to provide determinate and essentially identical void spaces therebetween, (5) holding the spaced cut fibrous elements in axially aligned array traveling on the paper and belt thereunder while forming the mouthpiece paper into a U-shape, (6) advancing the spaced elements in relation to a multi-chambered granular filter material transporting wheel to present successive ones of these void spaces between advancing elements to successive ones of such chambers, (7) injecting granular material in successive ones of such chambers into successive ones of these void spaces, (8) forming the mouthpiece paper into an overlapped tube with the successive fibrous filter elements and granular filter material in between enclosed fully therein, (9) sealing the overlapped tube to form a rod of alternating types of filter material, and (10) cutting the sealed rod of alternating types of filter material into lengths sufficient to make a plurality of shorter length filter tip assemblies for individual cigarettes.

References Cited by the Examiner

UNITED STATES PATENTS

| | | | |
|---|---|---|---|
| 279,384 | 6/1883 | Hemje et al. | 18—21 XR |
| 383,174 | 5/1888 | Fuchs | 25—75 XR |
| 477,060 | 6/1892 | Nirdlinger | 25—78 |
| 725,065 | 4/1903 | Franke | 18—21 XR |

FRANK E. BAILEY, *Primary Examiner.*

BERNARD STICKNEY, *Assistant Examiner.*